(12) United States Patent
Kies

(10) Patent No.: US 12,111,463 B2
(45) Date of Patent: Oct. 8, 2024

(54) HEAD-MOUNTED DISPLAY APPARATUS AND OPERATING METHOD THEREOF

(71) Applicant: Samsung Electronics Co., Ltd., Suwon-si (KR)

(72) Inventor: Pawel Kies, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/451,428

(22) Filed: Aug. 17, 2023

(65) Prior Publication Data

US 2024/0210678 A1    Jun. 27, 2024

(30) Foreign Application Priority Data

Dec. 22, 2022    (KR) .......................... 10-2022-0182053

(51) Int. Cl.
*G02B 27/00*    (2006.01)
*G02B 27/01*    (2006.01)

(52) U.S. Cl.
CPC ..... *G02B 27/0093* (2013.01); *G02B 27/0101* (2013.01); *G02B 27/017* (2013.01); *G02B 27/0179* (2013.01); *G02B 2027/0138* (2013.01); *G02B 2027/014* (2013.01); *G02B 2027/0185* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 9,370,302 B2 | 6/2016 | Krueger | |
| 9,552,060 B2 | 1/2017 | Ambrus et al. | |
| 9,910,490 B2 | 3/2018 | Jahnke | |
| 10,018,847 B2 | 7/2018 | Li et al. | |
| 10,231,614 B2 | 3/2019 | Krueger | |
| 11,442,543 B1* | 9/2022 | Rai Kurlethimar | G06F 3/012 |
| 2009/0214086 A1 | 8/2009 | Thomet | |
| 2013/0169532 A1* | 7/2013 | Jahnke | G06F 3/04842 345/157 |
| 2013/0169533 A1* | 7/2013 | Jahnke | G06F 3/017 345/158 |
| 2015/0286070 A1 | 10/2015 | Aikawa | |
| 2016/0007849 A1 | 1/2016 | Krueger | |
| 2020/0214559 A1* | 7/2020 | Krueger | A61B 5/163 |
| 2020/0372677 A1 | 11/2020 | Yoon et al. | |

FOREIGN PATENT DOCUMENTS

JP    3242685 B2    12/2001

* cited by examiner

*Primary Examiner* — Parul H Gupta
(74) *Attorney, Agent, or Firm* — Jefferson IP Law, LLP

(57) ABSTRACT

A head-mounted display apparatus is provided. The head-mounted display apparatus includes at least one camera, at least one sensor, and at least one processor operatively connected to the at least one camera and the at least one sensor. The at least one processor may be configured to acquire information about head pose and head-based gaze direction of a user, based on data input from the at least one sensor and multiple key points input from the at least one camera according to recognizing rotation of a user's head, estimate gaze lines of the user, based on the acquired information about head pose and head-based gaze direction, and estimate a distance to a target point, based on the gaze lines of the user, according to identifying that vestibulo-ocular reflex is activated based on the gaze lines of the user.

20 Claims, 7 Drawing Sheets

HEAD-MOUNTED DISPLAY APPARATUS AND OPERATING METHOD THEREOF

CROSS-REFERENCE TO RELATED APPLICATION(S)

This application is based on and claims priority under 35 U.S.C. § 119(a) of a Korean patent application number 10-2022-0182053, filed on Dec. 22, 2022, in the Korean Intellectual Property Office, the disclosure of which is incorporated by reference herein in its entirety.

BACKGROUND

1. Field

The disclosure relates to a head-mounted display apparatus, an operating method thereof, and a storage medium.

2. Description of Related Art

Among electronic devices, there are electronic devices provided in a form that may be worn on a human body. Such electronic devices may be generally referred to as wearable devices. A wearable device may include a head-mounted display (HMD) apparatus among types of electronic devices that may be worn on the human body.

The head-mounted display apparatus may be worn on a body part of a user (e.g., the head of a user) and provide virtual reality, augmented reality (AR), or mixed reality (MR) environments to the user. Providing a virtual reality (VR) environment may include, for example, displaying a screen for realizing virtual reality and providing various user interfaces for realizing virtual reality.

In the virtual reality, augmented reality or mixed reality, distance information of peripheral objects through scene understanding and virtual objects may be disposed according thereto. Therefore, it may be important to recognize peripheral scenes and correctly estimate distances to objects to be targeted for seamless disposition of the virtual objects.

In the related art, the distance to an object to be targeted is schematically estimated through the user's eyes, a depth camera may be used to estimate the distance to the object to be targeted, or distance information of peripheral objects may be acquired by using multiple stereo cameras.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a head-mounted display apparatus, an operating method thereof, and a storage medium.

Additional aspects will be set forth in part in the description which follows and, in part, will be apparent from the description, or may be learned by practice of the presented embodiments.

In accordance with an aspect of the disclosure, a head-mounted display apparatus is provided. The head-mounted apparatus includes at least one camera, at least one sensor, and at least one processor operatively connected to the at least one camera and the at least one sensor. The at least one processor is configured to acquire information about head pose and head-based gaze direction of a user, based on data input from the at least one sensor and multiple key points input from the at least one camera according to recognizing rotation of a user's head, estimate gaze lines of the user, based on the acquired information about head pose and head-based gaze direction, and estimate a distance to a target point, based on the user's gaze lines, according to identifying that vestibulo-ocular reflex is activated based on the user's gaze lines.

In accordance with another aspect of the disclosure, a method of operating a head-mounted display apparatus is provided. The operating method includes at least one camera, at least one sensor, and at least one processor, includes acquiring information about head pose and head-based gaze direction of a user, based on data input from the at least one sensor and multiple key points input from the at least one camera according to recognizing rotation of a user's head, estimating gaze lines of the user, based on the acquired information about head pose and head-based gaze direction, identifying that vestibulo-ocular reflex is activated based on the user's gaze lines, and estimating a distance to a target point, based on the user's gaze lines.

Another aspect of the disclosure is to provide at least one non-transitory computer-readable storage medium storing one or more programs for executing, based on execution of an application, acquiring information about head pose and head-based gaze direction of a user, based on data input from the at least one sensor and multiple key points input from the at least one camera according to recognizing rotation of a user's head, estimating gaze lines of the user, based on the acquired information about head pose and head-based gaze direction, identifying that vestibulo-ocular reflex is activated based on the user's gaze lines, and estimating a distance to a target point, based on the user's gaze lines.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the spirit and scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms as used herein are used to describe embodiments of the disclosure, and are not intended to restrict and/or limit the disclosure. A singular expression may include a plural expression unless they are definitely different in a context. As used herein, such expressions as "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof. The same or like reference signs presented in the respective drawings indicate members performing substantially the same or like functions.

Figure 1:
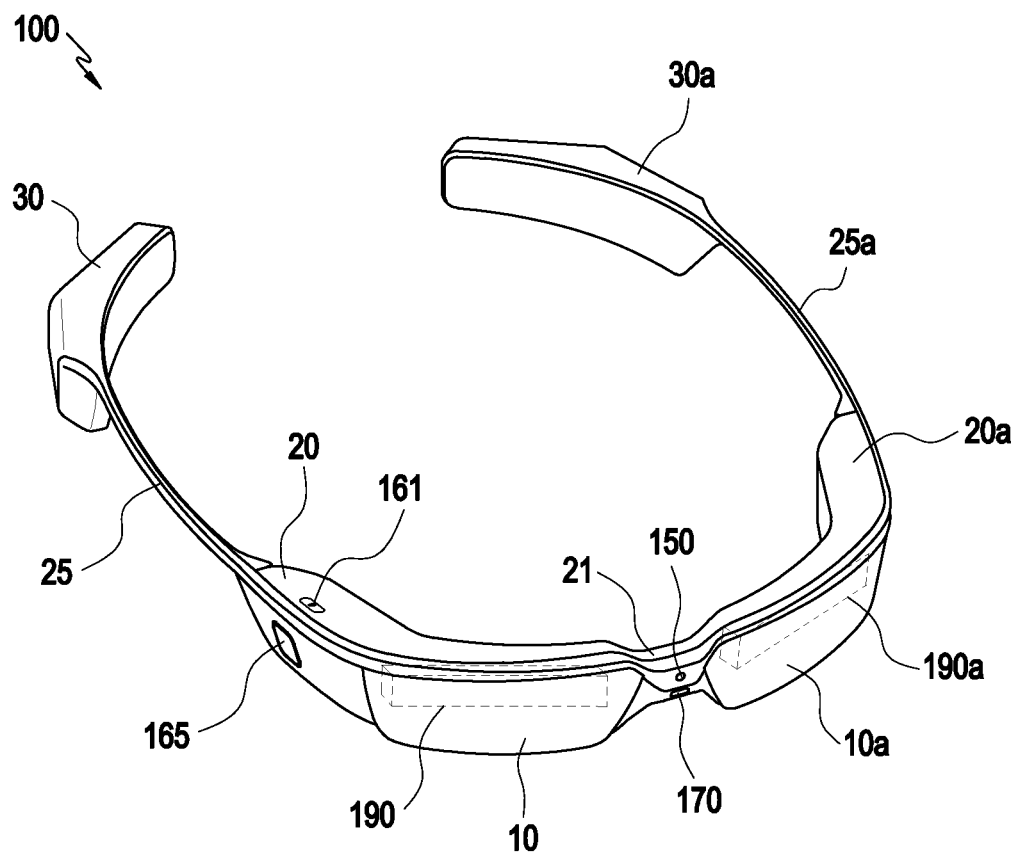
FIG. 1 is a schematic perspective diagram illustrating a head-mounted display apparatus according to an embodiment of the disclosure.

FIG. 1 is a schematic perspective diagram illustrating a head-mounted display apparatus according to an embodiment of the disclosure.

Referring to FIG. 1, it may be easily understood by those skilled in the art that positions of components shown in a head-mounted display apparatus 100 in FIG. 1 to be described below may be changed according to performance or a structure of the head-mounted display apparatus 100.

Referring to FIG. 1, the head-mounted display apparatus 100 is referred to a display apparatus which may be worn on the user's head. A see-through display unit may be positioned in an area adjacent to the user's head (e.g., the eye) and a speaker (not shown) may be positioned at an area adjacent to the user's ear so as to provide visual information and audio information to the user. The head-mounted display apparatus 100 may include a glasses-type display apparatus or a helmet-type display apparatus.

The head-mounted display apparatus 100 may include a monocular-type display apparatus having one display unit 190 for displaying a content and a binocular-type display apparatus having multiple display units 190 and 190a capable of displaying three-dimensional image. The binocular-type display apparatus may selectively operate one of the multiple display units 190 and 190a.

The head-mounted display apparatus 100 may include an optical lens 10, a first housing 20 for receiving a portion of the optical lens 10, a second housing 30 including a battery, a housing connection part 25 for connecting the first housing 20 and the second housing 30. In addition, the head-mounted display apparatus 100 may include an optical lens 10a, a third housing 20a for receiving a portion of the optical lens 10a, a fourth housing 30a including a battery, a housing connection part 25a for connecting the third housing 20a and the fourth housing 30a. The battery may be positioned in the first housing 20 or the third housing 20a.

The head-mounted display apparatus 100 may be mounted on the user's head by the housing connection part 25 or 25a flexible due to elasticity.

The head-mounted display apparatus 100 may include a bridge 21 for connecting the first housing 20 and the third housing 20a.

The display unit 190 or 190a may be positioned at a distance (e.g., 5 cm or less) spaced apart from a front surface of the optical lens 10 or 10a or positioned at a distance (e.g., 5 cm or less) spaced apart from a rear surface of the optical lens 10 or 10a. It may be easily understood by those skilled in the art that a distance between display units 190 and 190a, a distance between optical lenses 10 and 10a, and a spacing distance between the display unit 190 or 190a and the optical lens 10 or 10a may be changed according to performance or a structure of the head-mounted display apparatus 100.

Figure 2:
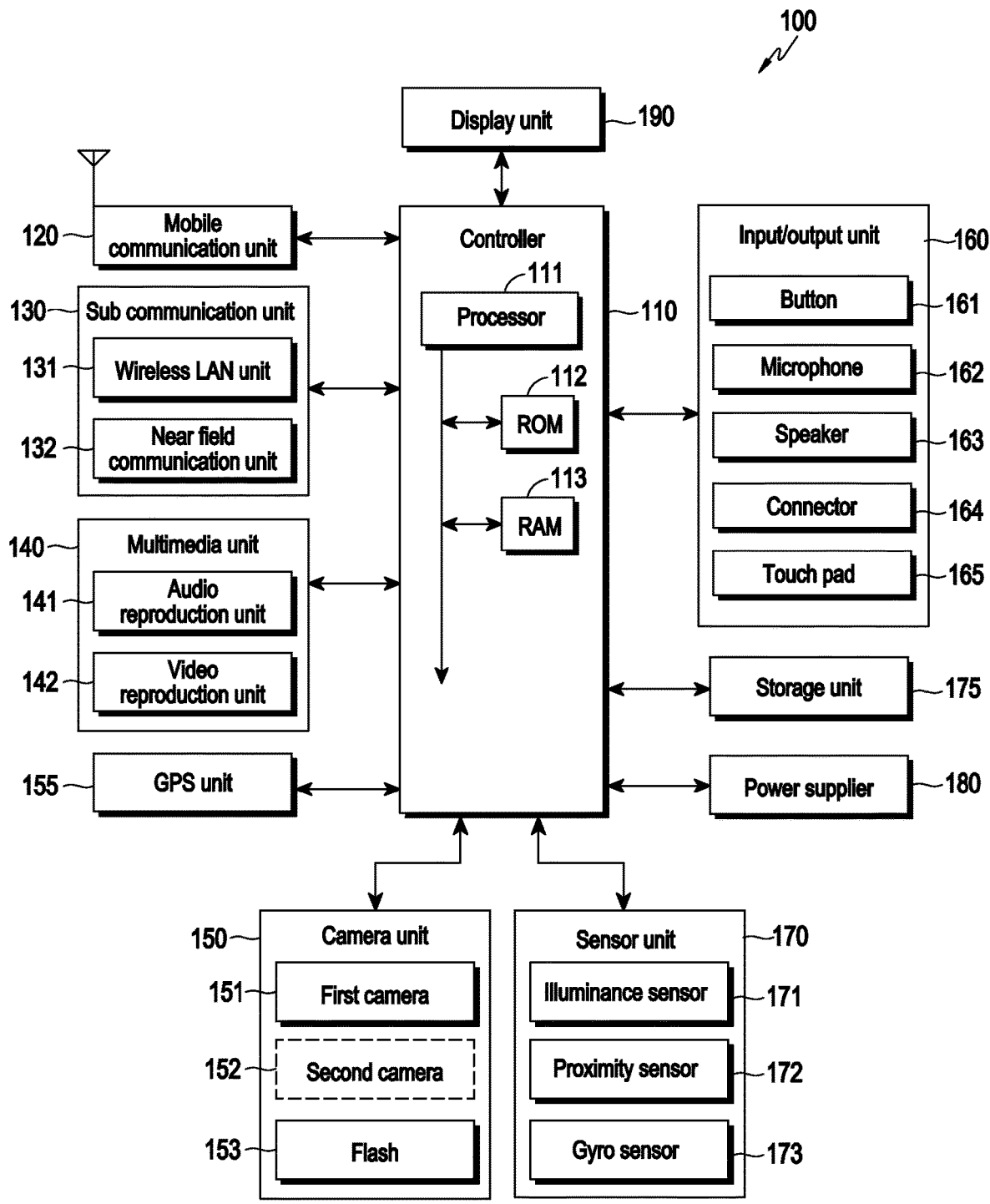
FIG. 2 is a schematic block diagram illustrating a head-mounted display apparatus according to an embodiment of the disclosure.

The head-mounted display apparatus 100 may include a camera unit 150 (see FIG. 2) and a sensor unit 170 (see FIG. 2). The camera unit 150 may be positioned in at least one of the first housing 20 and the third housing 20a. For example, the camera unit may be positioned in one of the first housing 20 and the third housing 20a or respectively positioned in the first housing 20 and the third housing 20a. Alternatively, the camera unit 150 may be positioned in the bridge 21.

According to an embodiment of the disclosure, at least a portion of the camera unit 150 may be included in the display unit 190 or 190a.

The sensor unit 170 may be positioned in at least one of the first housing 20 and the third housing 20a. For example, the sensor unit may be positioned in one of the first housing 20 and the third housing 20a or respectively positioned in the first housing 20 and the third housing 20a. Alternatively, the sensor unit 170 may be positioned in the bridge 21. The sensor unit 170 may include at least one of a light sensor for detecting light and a proximity sensor for determining whether the user wears the head-mounted display apparatus 100. The light sensor and the proximity sensor may separately exist or may exist as one sensor (e.g., an ambient light sensor). The sensor unit 170 may be disposed at a position optimal for detecting external light passing through the lens 10. The sensor unit 170 may identify a type of a light source emitting external light. For example, the sensor unit 170 may identify whether the external light is natural light (sun light) or artificial light (fluorescent light, light-emitting diode (LED), or the like).

The first housing 20 of the head-mounted display apparatus 100 may include at least one of a button 161 (see FIG.

2), a microphone 162 (see FIG. 2), a speaker 163 (see FIG. 2), or a touch pad 165 (see FIG. 2). The term "housing" in an embodiment of the disclosure may include the first housing 20, the second housing 30, the third housing 20a, or the fourth housing 30a.

FIG. 2 is a schematic block diagram illustrating a head-mounted display apparatus according to an embodiment of the disclosure.

Referring to FIG. 2, the head-mounted display apparatus 100 may be wired or wirelessly connected to an external apparatus (not shown) by using a mobile communication unit 120, a sub communication unit 130, and a connector 164. The external apparatus may include a mobile phone (not shown), a smart phone (not shown), a tablet PC (not shown), a moving picture experts group (MPEG-1 or MPEG-2) audio layer 3 (MP3) player, a video player, a tablet PC, a three-dimensional television (3D-TV), a smart TV, a light-emitting diodes television (LED TV), a liquid-crystal display television (LCD TV), or server (not shown) which may include a screen having a larger area than those of the display units 190 and 190a. Furthermore, the external apparatus may include another head-mounted display apparatus (not shown).

The head-mounted display apparatus 100 may include an apparatus capable of transmitting or receiving data (e.g., an image, a text, a voice, a video, and the like) by using a user input (or user interaction, for example, a voice, a motion, a touch, or a touch gesture) input through the head-mounted display apparatus 100 to or from a connectible external apparatus.

The head-mounted display apparatus 100 may include a display unit 190 or 190a, a controller 110, a mobile communication unit 120, a sub communication unit 130, a multimedia unit 140, a camera unit 150, a global positioning system (GPS) unit 155, an input/output unit 160, a sensor unit 170, a storage unit 175, and a power supplier 180.

The sub communication unit 130 may include at least one of a wireless LAN unit 131 and a near field communication unit 132, and the multimedia unit 140 may include at least one of an audio reproduction unit 141 and a video reproduction unit 142.

The camera unit 150 may include at least one of a first camera 151 and a second camera 152 and may further include a flash 153.

The input/output unit 160 may include at least one of a button 161, a microphone 162, a speaker 163, the connector 164, and a touch pad 165.

According to an embodiment of the disclosure, the camera unit 150 may track the user's eyes (e.g., pupils) or gaze trajectory by using multiple cameras of the same standard and performance. To this end, the camera unit 150 may include a scene camera for observing a user's view. In an embodiment of the disclosure, the camera unit 150 may capture a reflection pattern of light emitted by the flash 153 to the user's eye. For example, the flash 153 may emit light in an infrared band for tracking a trajectory of a gaze by using the camera unit 150. For example, the flash 153 may include an infrared light-emitting diode (IR LED). According to an embodiment of the disclosure, the controller 110 may adjust a location of a virtual image so that the virtual image projected to the display unit 190 corresponds to a direction in which the user's eye gazes.

According to an embodiment of the disclosure, the camera unit 150 may periodically or aperiodically transmit information on the user's eye and the gaze trajectory (e.g., trajectory information) to the controller 110. According to an embodiment of the disclosure, the camera unit 150 may transmit trajectory information to the controller 110 based on the trajectory information when detecting that a gaze trajectory of the user is changed.

According to an embodiment of the disclosure, at least one of the first camera 151 and the second camera 152 may include multiple camera modules (not shown). For example, the second camera 152 may be disposed on a surface (e.g., a surface facing the −Y axis) of the head-mounted display apparatus 100. For example, the head-mounted display apparatus 100 may include multiple camera modules having different properties (e.g., an angle of view) or functions and control to change angles of view of camera modules based on a user's selection and/or trajectory information. For example, at least one of the multiple camera modules may be a wide angle camera and at least another camera may be a telephoto camera.

The sensor unit 170 may include an illuminance sensor 171, a proximity sensor 172, and a gyro sensor 173. In an embodiment of the disclosure, the sensor unit 170 may further include a magnetic sensor (not shown) or an acceleration sensor (not shown).

The controller 110 may include a processor 111, a read-only memory (ROM) 112 in which a control program for controlling the head-mounted display apparatus 100 is stored and a random-access memory (RAM) 113 for storing a signal or data input from the outside of the head-mounted display apparatus 100 or used as a storage area for various operations performed in the head-mounted display apparatus 100.

The controller 110 may control overall operations of the head-mounted display apparatus 100 and signal flow among internal components 120 to 195 of the head-mounted display apparatus 100 and perform a data processing function.

The controller 110 may control power supply from the power supplier 180 to the internal components 120 to 195. In addition, in case that a user input or a configured and stored condition is satisfied, the controller 110 may execute an operation system (OS) and various applications stored in the storage unit 175.

The processor 111 may include a graphic processing unit (GPU) (not shown) for graphic processing. With respect to the processor 111, a core (not shown) and the GPU (not shown) may be implemented as a system on chip (SoC). The processor 111 may include a single core, dual cores, triple cores, quad cores, and multiple cores. Furthermore, the processor 111, the ROM 112, and the RAM 113 may be connected to each other through an internal bus.

The controller 110 may control the mobile communication unit 120, the sub communication unit 130, the multimedia unit 140, the camera unit 150, the GPS unit 155, the input/output unit 160, the sensor unit 170, the storage unit 175, the power supplier 180, and the display unit 190.

According to an embodiment of the disclosure, the processor 111 may determine movement of the head-mounted display apparatus 100 and/or a user's gaze direction and/or a head pose indicating a position or rotation of the user's head by using a user's operation (e.g., approach of the user's body with respect to the head-mounted display apparatus 100 or rotation of the head of the user wearing the head-mounted display apparatus 100) acquired using the camera unit 150 and information on the head-mounted display apparatus 100 acquired using at least one of the proximity sensor 172, the gyro sensor 173, or the acceleration sensor of the sensor unit 170. According to an embodiment of the disclosure, in addition to the sensors described above, the head-mounted display apparatus 100 may include a magnetic sensor that may measure a direction using a magnetic field, and/or a Hall sensor that may acquires movement information (e.g., a movement direction, movement angle, or movement distance) using a strength of a magnetic field. For example, the processor 111 may determine movement of the head-mounted display apparatus 100 and/or movement (e.g., rotation of the user's head) of the user, based on information acquired from the magnetic sensor and/or the Hall sensor.

According to an embodiment of the disclosure, the processor 111 may fuse data with respect to movement input from the magnetic sensor and/or the gyro sensor included in the sensor unit 170 and key points according to the user gaze tracking input from the scene camera included in the camera unit 150 so as to acquire a pose of the head-mounted display apparatus 100, that is, head pose and head-based gaze direction information. For example, the processor 111 may identify a position and a rotation angle of the head changed according to movement of the user, based on initial pose information of the head. According to an embodiment of the disclosure, by using the scene camera to determine a head pose, the farther a distance from a target, the more accurate the angle may be measured. This is because key points used for head pose estimation become farther apart from each other for a relatively distance target.

According to an embodiment of the disclosure, the processor 111 may detect rotation of the user's head by using the sensor unit 170, based on the user input received through the input/output unit 160 in a state in which the user's gaze is fixed on the target and initiate a series of operations for measuring a distance to the target. In an embodiment of the disclosure, a program for processing the series of operations for measuring a distance to the target may be stored in the ROM 112 or the RAM 113 of the controller 110.

According to an embodiment of the disclosure, the processor 111 may acquire the head pose and the head-based gaze direction by using data input from the magnetic sensor and/or the gyro sensor included in the sensor unit 170 without using the scene camera.

According to an embodiment of the disclosure, the processor 111 may estimate a user's current gaze line, based on the head pose and the head-based gaze direction acquired through various methods. According to an embodiment of the disclosure, the processor 111 may control to identify a user's gaze lines changing according to rotation of the user's head.

According to an embodiment of the disclosure, the processor 111 may measure a distance to the target by using vestibulo-ocular reflex (VOR). The vestibulo-ocular reflex is referred to as a reflex action that stabilizes the gaze while the eyeball moves as a reflex action while the user's head moves due to the activation of the vestibular system. Such reflex action may function to stabilize an image on the retina of the eye during head movement and cause the eyes to move in an opposite direction to a direction of the head movement, thereby fixing the gaze in one position. For example, when the head moves to the right, the eye moves to the left and accordingly, an image to the eyes may be maintained even when the head rotates. In an embodiment of the disclosure, the processor 111 may identify whether vestibulo-ocular reflex is activated. In an embodiment of the disclosure, the processor 111 may determine that the vestibulo-ocular reflex is activated, in case that at least one of the user's eyelids is open and K gaze lines among recently identified gaze lines are intersected with each other within a predetermined range from an identical point P.

In an embodiment of the disclosure, the processor 111 may estimate a distance to the target, based on the K gaze lines intersecting within the predetermined range from point P, in case of determining that the vestibulo-ocular reflex is activated.

In an embodiment of the disclosure, the processor 111 may estimate a distance to the target by measuring an angular velocity of the eyeball, which is inversely proportional to the distance. In an embodiment of the disclosure, the processor 111 may use, in parallel, the K gaze lines intersecting within the predetermined range from point P and the angular velocity to estimate a distance to the target, thereby increasing accuracy.

In an embodiment of the disclosure, the processor 111 may identify whether the distance to the target is valid by identifying reliability of input data and accuracy of distance estimation.

Figure 3:
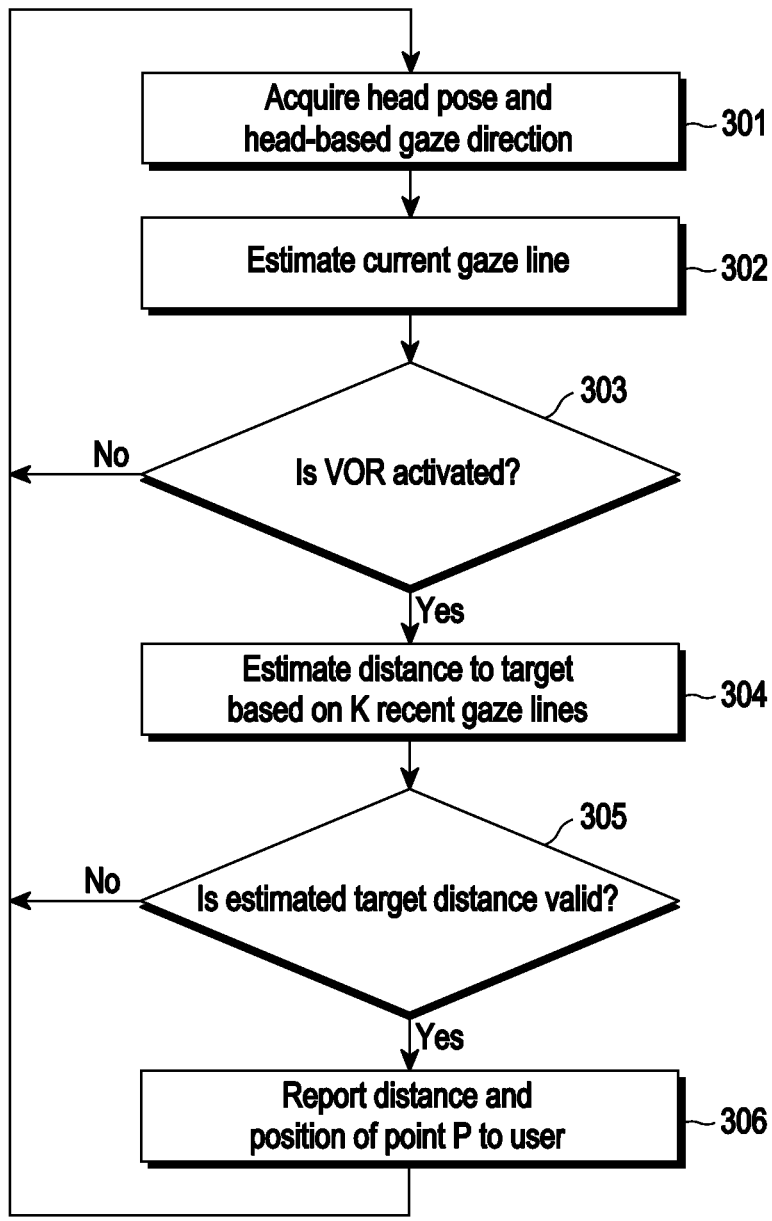
FIG. 3 is a flowchart illustrating an operation of acquiring distance information according to an embodiment of the disclosure.

FIG. 3 is a flowchart illustrating an operation of acquiring distance information according to an embodiment of the disclosure.

According to various embodiments of the disclosure, the operations shown in FIG. 3 are not limited to the described order and may be performed in various orders. According to various embodiments of the disclosure, more operations or fewer operations than the operations shown in FIG. 3 may be performed.

Referring to FIG. 3, in operation 301, the head-mounted display apparatus 100 may detect that the user's head rotates by using the sensor unit 170 in a state in which the user's gaze is fixed on the target and initiate operations for measuring a distance to the target. In an embodiment of the disclosure, the head-mounted display apparatus 100 may display, on the display unit 190, a user interface for initiating operations for measuring a distance to the target and initiate operations for measuring a distance to the target according to receiving a user input through the user interface.

In an embodiment of the disclosure, the head-mounted display apparatus 100 may fuse data with respect to movement input from the magnetic sensor and/or the gyro sensor included in the sensor unit 170 and key points according to the user gaze tracking input from the scene camera included in the camera unit 150 so as to acquire a pose of the head-mounted display apparatus 100, that is, head pose and head-based gaze direction information. For example, the head-mounted display apparatus 100 may identify a position and a rotation angle of the head changed according to movement of the user, based on initial pose information of the head. According to an embodiment of the disclosure, by using the scene camera to determine a head pose, the farther a distance from the target, the more accurate the head-mounted display apparatus 100 may measure the angle.

In an embodiment of the disclosure, the head-mounted display apparatus 100 may acquire the head poser and the head-based gaze direction by using data input from the magnetic sensor and/or the gyro sensor included in the sensor unit 170 without using the scene camera.

In operation 302, the head-mounted display apparatus 100 may estimate a user's current gaze line, based on the head pose and the head-based gaze direction acquired from the sensor unit 170. According to an embodiment of the disclosure, the head-mounted display apparatus 100 may control to identify a user's gaze lines changing according to rotation of the user's head.

In operation 303, the head-mounted display apparatus 100 may identify whether vestibulo-ocular reflex is activated. In an embodiment of the disclosure, the head-mounted display apparatus 100 may determine that the vestibulo-ocular reflex is activated, in case that at least one of the user's eyelids is open and K gaze lines among recently identified gaze lines are intersected with each other within a predetermined range from an identical point P.

Figure 4A:
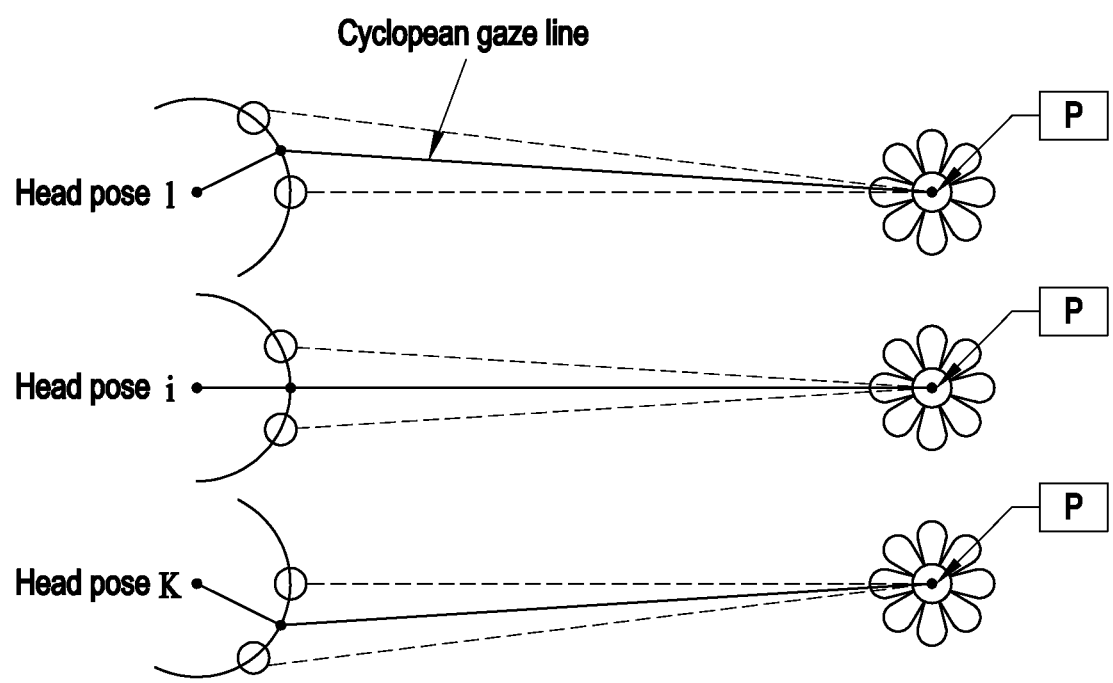
FIG. 4A is a diagram illustrating a method for identifying whether vestibulo-ocular reflex is activated according to an embodiment of the disclosure.

FIG. 4A is a diagram illustrating a method in which a head-mounted display apparatus identifies whether vestibulo-ocular reflex is activated according to an embodiment of the disclosure.

Figure 4B:
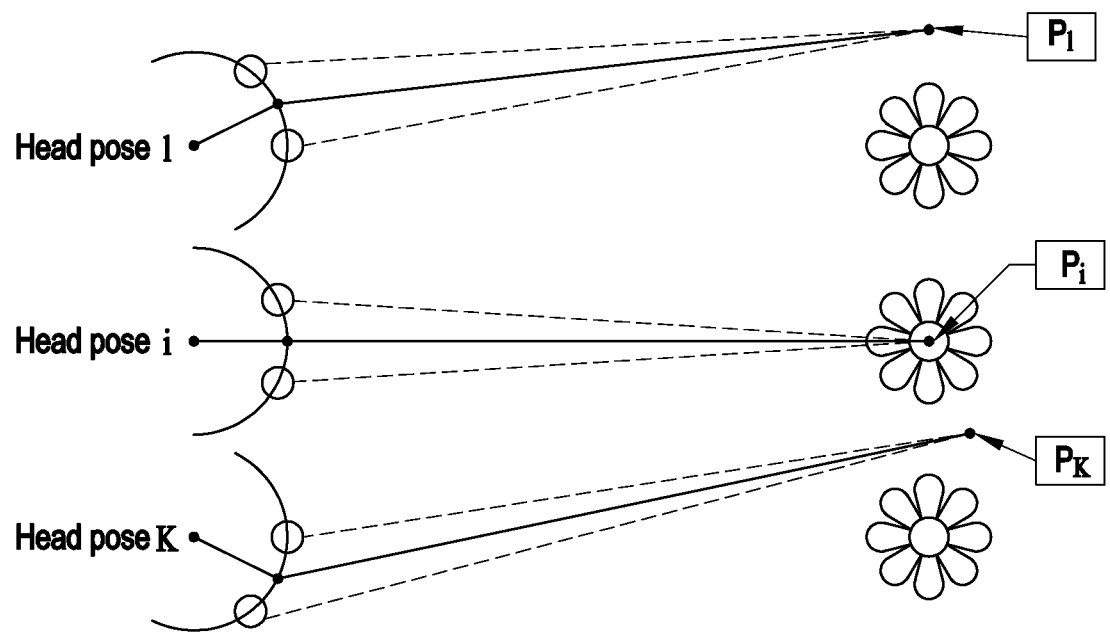
FIG. 4B is a diagram illustrating a method for identifying whether vestibulo-ocular reflex is activated according to an embodiment of the disclosure.

FIG. 4B is a diagram illustrating a method in which a head-mounted display apparatus identifies whether vestibulo-ocular reflex is activated according to an embodiment of the disclosure.

Referring to FIG. 4A, the head-mounted display apparatus 100 may identify K cyclopean gaze lines for each head pose according to rotation of the head. The cyclopean gaze line may be a gaze indicating the center of gaze lines of two eyeballs. In FIG. 4A, it may be identified that the K cyclopean gaze lines are intersected within a predetermined range from an identical point P, and in this case, the head-mounted display apparatus 100 may determine that vestibulo-ocular reflex is activated.

Referring to FIG. 4B, the head-mounted display apparatus 100 may identify that all K cyclopean gaze lines identified for each head pose are intersected at different points $P_i$, $P_j$, and $P_k$ deviating the predetermined range from point P according to rotation of the head, and in this case, the head-mounted display apparatus 100 may identify that vestibulo-ocular reflex is not activated.

In case of determining that vestibulo-ocular reflex is not activated, the head-mounted display apparatus 100 may re-acquire a head pose and a head-based gaze direction in operation 301 and re-estimate a current gaze line in operation 302.

In case of determining that vestibulo-ocular reflex is activated, in operation 304, the head-mounted display apparatus 100 may estimate a distance to the target, based on the K gaze lines intersecting with the predetermined range from point P.

Figure 5:
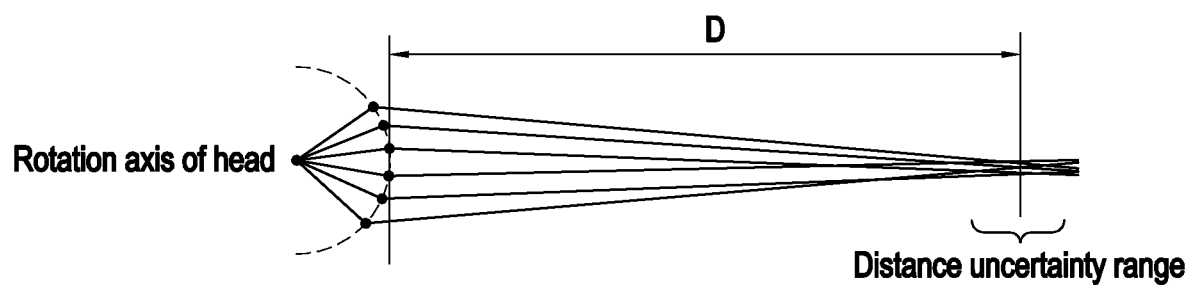
FIG. 5 is a view illustrating a method for estimating a distance to a target according to an embodiment of the disclosure.

FIG. 5 is a view illustrating a method for estimating a distance to a target, based on K gaze lines according to an embodiment of the disclosure.

Referring to FIG. 5, the head-mounted display apparatus 100 may estimate a distance D from a line where the eyeball moves around a rotation axis of the head to a point at which K recent gaze lines (i.e., cyclopean gaze lines) intersect. In an embodiment of the disclosure, the range in which the K recent gaze lines intersect may be configured to a value for minimizing uncertainty of distance estimation.

In an embodiment of the disclosure, the head-mounted display apparatus 100 may estimate a distance to the target by measuring an angular velocity of the eyeball, which is inversely proportional to the distance. In an embodiment of the disclosure, the head-mounted display apparatus 100 may use, in parallel, the K gaze lines intersecting near point P and the angular velocity to estimate a distance to the target, thereby increasing accuracy.

In operation 305, the head-mounted display apparatus 100 may identify whether the estimated distance to the target is valid by identifying the head pose, the head-based gaze direction, accuracy of the distance estimation, and reliability of input data with respect to the K gaze lines.

In case of determining that the estimated distance to the target is invalid, the head-mounted display apparatus 100 may re-acquire a head pose and a head-based gaze direction in operation 301.

In case of determining that the estimated distance to the target is valid, the head-mounted display apparatus 100 may report a position and a distance to point P to the user in operation 306. A distance estimation result indicating the position and the distance to point P may be displayed on the display unit 190 of the head-mounted display apparatus 100 to allow the user to visually identify the distance estimation result or guide by a voice through the speaker 163 of the input/output unit 160. In an embodiment of the disclosure, in case that the head-mounted display apparatus 100 is AR glasses, the distance estimation result may be dynamically overlaid on an image that the user is looking at by using a frame having a color contrasting with the image that the user is looking at. There are various methods for reporting the distance estimation result to the user in addition thereto.

Figure 6A:
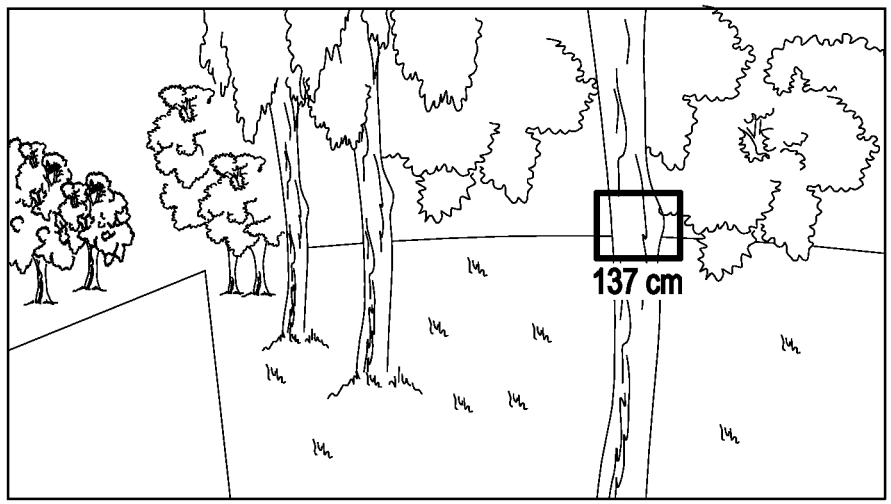
FIG. 6A is a view illustrating a method for displaying an estimated distance to a target on a display unit according to an embodiment of the disclosure.

FIG. 6A is a view illustrating a method for displaying an estimated distance to a target on a display unit according to an embodiment of the disclosure.

Figure 6B:
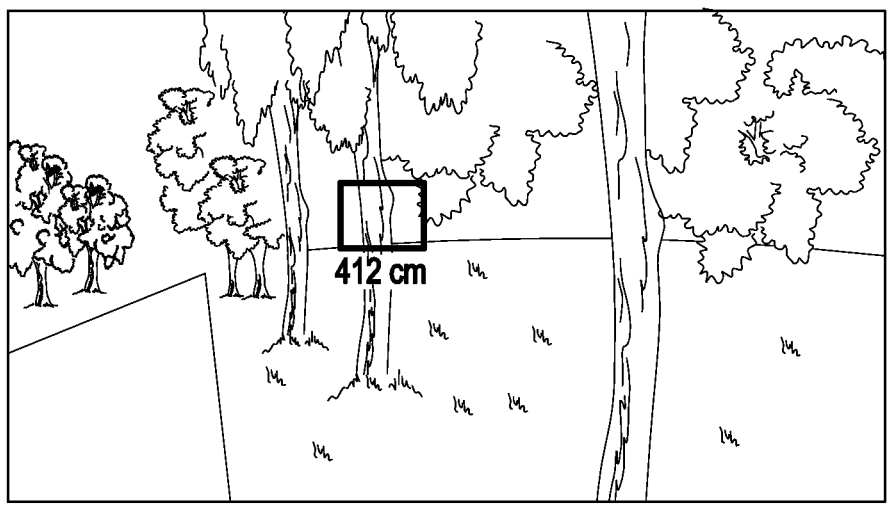
FIG. 6B is a view illustrating a method for displaying an estimated distance to a target on a display unit according to an embodiment of the disclosure.

FIG. 6B is a view illustrating a method for displaying an estimated distance to a target on a display unit according to an embodiment of the disclosure.

Referring to FIG. 6A, in case that the user looks at a target positioned at a relatively close distance, the distance (137 cm) to the target, which is estimated based on the operations in FIG. 3, may be overlaid on the image that the user is looking at.

Referring to FIG. 6B, in case that the user looks at a target positioned at an intermediate point, the distance (412 cm) to the target, which is estimated based on the operations in FIG. 3, may be overlaid on the image that the user is looking at.

In an embodiment of the disclosure, in case that vestibulo-ocular reflex is not activated, or a fixation point at which gaze lines intersect is too far, the scene camera may provide an unclear image. In this case, the head-mounted display apparatus 100 may not estimate a distance to the target or may not overlay the distance to the target on the image the user is looking at according to determining that the estimated distance to the target is invalid.

In an embodiment of the disclosure, the operations described in FIG. 3 may be repeated a sufficient number of times according to the number of times the head pose and the head-based gaze direction are acquired and calculation performance of the processor 111.

According to the disclosure described above, the user may select a target and the use of vestibulo-ocular reflex toward the selected target while rotating the head may allow stabilization of the target directed by the reflex. The method according to the disclosure may be equally applied to a single-eyed users. Assuming that the user's average head circumference is 580 mm, an angle at which one eye is rotated to be at a position of the other eye is 360 deg*64 mm/580 mm=39.7 deg, and, the method according to the disclosure may provide a long base line in case that the angle of the vestibulo-ocular reflex is equal to or greater than 39.37 deg compared to a method using vergence or a stereo camera to estimate the distance to the target, thus increasing distance estimation accuracy.

The method according to the disclosure may enable estimation of the physical dimensions of an object through reliable distance estimation to the object selected by the user and the estimated physical dimensions may be used for adjusting dimensions of a virtual object to be matched with a real object in an AR application.

According to the disclosure, by using the estimated distance to the object selected by the user, a distance to an object not selected by the user or an object partially covered by another object may be identified.

A head-mounted display apparatus according to an embodiment of the disclosure may include at least one camera 150, at least one sensor 170, and a controller 110 operatively connected to the at least one camera and the at least one sensor. The controller 110 may be configured to acquire information about head pose and head-based gaze direction of a user, based on data input from the at least one sensor and multiple key points input from the at least one camera according to recognizing rotation of a user's head, estimate gaze lines of the user, based on the acquired information about head pose and head-based gaze direction, and estimate a distance to a target point, based on the user's gaze lines, according to identifying that vestibulo-ocular reflex is activated based on the user's gaze lines.

According to an embodiment of the disclosure, the at least one processor may be configured to receive the data according to rotation of the user's head from the at least one sensor and receive the multiple key points according to user gaze tracking from the at least one camera.

According to an embodiment of the disclosure, the at least one sensor may include a magnetic sensor or a gyro sensor.

According to an embodiment of the disclosure, the at least one camera may include a scene camera for observing a user's view.

According to an embodiment of the disclosure, the at least one processor may be further configured to determine that the vestibulo-ocular reflex is activated, in case that at least one of eyelids of the user is open and at least some gaze lines among gaze lines of the user intersect within a predetermined range from an identical point.

According to an embodiment of the disclosure, in case that at least one of eyelids of the user is not open and at least some gaze lines among gaze lines of the user do not intersect within a predetermined range from an identical point, the at least one processor may be further configured to determine that the vestibulo-ocular reflex is not activated and re-acquire the information about head pose and head-based gaze direction of the user.

According to an embodiment of the disclosure, the head-mounted display apparatus may further include at least one display or a speaker, and the at least one processor may be further configured to report the estimated distance to the target to the user by using the at least one display or the speaker.

According to an embodiment of the disclosure, the at least one processor may be further configured to receive a user input for estimating the distance to the target point through a user interface.

According to an embodiment of the disclosure, the at least one processor may be further configured to repeatedly estimate the distance to the target point a predetermined number of times, based on the number of times the information about head pose and the head-based gaze direction are acquired and calculation performance of the at least one processor.

According to an embodiment of the disclosure, the gaze lines of the user may correspond to cyclopean gaze lines indicating a center of gaze lines of two eyeballs of the user.

According to an embodiment of the disclosure, a method of operating a head-mounted display apparatus 100 including at least one camera 150, at least one sensor 170, and the controller 110, may include acquiring information about head pose and head-based gaze direction of a user, based on data input from the at least one sensor and multiple key points input from the at least one camera according to recognizing rotation of a user's head in operation 301, estimating gaze lines of the user, based on the acquired information about head pose and head-based gaze direction in operation 302, identifying that vestibulo-ocular reflex is activated based on the user's gaze lines in operation 303, and estimating a distance to a target point, based on the user's gaze lines in operation 304.

According to an embodiment of the disclosure, the acquiring of the head pose and head-based gaze direction information of the user may include an operation of receiving the data according to rotation of the user's head from the at least one sensor and receiving the multiple key points according to user gaze tracking from the at least one camera.

According to an embodiment of the disclosure, the at least one sensor may include a magnetic sensor or a gyro sensor.

According to an embodiment of the disclosure, the at least one camera may include a scene camera for observing a user's view.

According to an embodiment of the disclosure, the operation of identifying that vestibulo-ocular reflex is activated based on the user's gaze lines may include an operation of determining that the vestibulo-ocular reflex is activated, in case that at least one of eyelids of the user is open and at least some gaze lines among gaze lines of the user intersect within a predetermined range from an identical point.

According to an embodiment of the disclosure, in case that at least one of eyelids of the user is not open and at least some gaze lines among gaze lines of the user do not intersect within a predetermined range from an identical point, an operation of determining that the vestibulo-ocular reflex is not activated and an operation of re-acquiring the information about head pose and head-based gaze direction of the user may be further included.

According to an embodiment of the disclosure, an operation of reporting the estimated distance to the target point to the user by using the at least one display or the speaker may be further included.

According to an embodiment of the disclosure, an operation of receiving a user input for estimating the distance to the target point through a user interface may be further included.

According to an embodiment of the disclosure, the operation of estimating the distance to the target point may be repeatedly perform a predetermined number of times, based on the number of times the information about head pose and the head-based gaze direction are acquired and calculation performance of the at least one processor.

According to an embodiment of the disclosure, the gaze lines of the user may correspond to cyclopean gaze lines indicating a center of gaze lines of two eyeballs of the user.

The embodiments set forth herein have been presented for explanation and understanding of the technical contents of the disclosure, and are not intended to limit the technical scope of the disclosure. Therefore, the scope of the disclosure should be construed to cover all changes and modifications or various other embodiments based on the technical idea of the disclosure.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., a program) including one or more instructions that are stored in a storage medium (e.g., an internal memory or external memory) that is readable by a machine (e.g., the head mounted display 100). For example, a processor (e.g., the processor 110) of the machine (e.g., the head mounted display 100) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of at least one non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A head-mounted display apparatus comprising:
   at least one camera;
   at least one sensor; and
   at least one processor operatively connected to the at least one camera and the at least one sensor,
   wherein the at least one processor is configured to:
      acquire information about head pose and head-based gaze direction of a user, based on data input from the at least one sensor and multiple key points input from the at least one camera according to recognizing rotation of a user's head,
      estimate gaze lines of the user, based on the acquired information about head pose and head-based gaze direction, and
      estimate a distance to a target point, based on the gaze lines of the user, according to identifying that vestibulo-ocular reflex is activated based on the gaze lines of the user.

2. The head-mounted display apparatus of claim 1, wherein the at least one processor is further configured to:
   receive the data according to rotation of the user's head from the at least one sensor, and
   receive the multiple key points according to user gaze tracking from the at least one camera.

3. The head-mounted display apparatus of claim 1, wherein the at least one sensor comprises a magnetic sensor or a gyro sensor.

4. The head-mounted display apparatus of claim 1, wherein the at least one camera comprises a scene camera configured to observe a user's view.

5. The head-mounted display apparatus of claim 1, wherein the at least one processor is further configured to determine that the vestibulo-ocular reflex is activated, in case that at least one of eyelids of the user is open and at least some gaze lines among gaze lines of the user intersect within a predetermined range from an identical point.

6. The head-mounted display apparatus of claim 1, wherein the at least one processor is further configured to:
   in case that at least one of eyelids of the user is not open and at least some gaze lines among the gaze lines of the user do not intersect within a predetermined range from an identical point, determine that the vestibulo-ocular reflex is not activated, and
   re-acquire the information about head pose and head-based gaze direction of the user.

7. The head-mounted display apparatus of claim 1, further comprising at least one display or a speaker, wherein the at least one processor is configured to report the estimated distance to the target point to the user by using the at least one display or the speaker.

8. The head-mounted display apparatus of claim 1, wherein the at least one processor is further configured to receive a user input for estimating the distance to the target point through a user interface.

9. The head-mounted display apparatus of claim 1, wherein the at least one processor is further configured to repeatedly estimate the distance to the target point a predetermined number of times, based on the number of times the information about head pose and head-based gaze direction is acquired and calculation performance of the at least one processor.

10. The head-mounted display apparatus of claim 1, wherein the gaze lines of the user correspond to cyclopean gaze lines indicating a center of gaze lines of two eyeballs of the user.

11. A method of operating a head-mounted display apparatus comprising at least one camera, at least one sensor, and at least one processor, the method comprising:
    acquiring information about head pose and head-based gaze direction of a user, based on data input from the at least one sensor and multiple key points input from the at least one camera according to recognizing rotation of a user's head;
    estimating gaze lines of the user, based on the acquired information about head pose and head-based gaze direction;
    identifying that vestibulo-ocular reflex is activated based on the gaze lines of the user; and
    estimating a distance to a target point, based on the gaze lines of the user.

12. The method of claim 11, wherein the acquiring of the head pose and head-based gaze direction information of the user comprises:
    receiving the data according to rotation of the user's head from the at least one sensor; and
    receiving the multiple key points according to user gaze tracking from the at least one camera.

13. The method of claim 11, wherein the at least one sensor comprises a magnetic sensor or a gyro sensor.

14. The method of claim 11, wherein the at least one camera comprises a scene camera configured to observe a user's view.

15. The method of claim 11, wherein the identifying that vestibulo-ocular reflex is activated based on the gaze lines of the user comprises determining that the vestibulo-ocular reflex is activated, in case that at least one of eyelids of the user is open, and at least some gaze lines among gaze lines of the user intersect within a predetermined range from an identical point.

16. The method of claim 11, further comprising, in case that at least one of eyelids of the user is not open and at least some gaze lines among the gaze lines of the user do not intersect within a predetermined range from an identical point, determining that the vestibulo-ocular reflex is not activated and re-acquiring the information about head pose and head-based gaze direction of the user.

17. The method of claim 11, further comprising reporting the estimated distance to the target point to the user by using at least one display or speaker.

18. The method of claim 11, further comprising receiving a user input for estimating the distance to the target point through a user interface.

19. The method of claim 11, wherein the estimating of the distance to the target point is repeatedly perform a predetermined number of times, based on the number of times the information about head pose and head-based gaze direction is acquired and calculation performance of the at least one processor.

20. The method of claim 11, wherein the gaze lines of the user correspond to cyclopean gaze lines indicating a center of gaze lines of two eyeballs of the user.

* * * * *